United States Patent
Chen et al.

(10) Patent No.: US 7,403,711 B2
(45) Date of Patent: Jul. 22, 2008

(54) OPTICAL DIGITAL-TO-ANALOG CONVERTER AND METHOD OF OPTICALLY CONVERTING DIGITAL DATA TO ANALOG FORM

(75) Inventors: Young-Kai Chen, Berkeley Heights, NJ (US); Andreas Leven, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 427 days.

(21) Appl. No.: 11/284,865

(22) Filed: Nov. 22, 2005

(65) Prior Publication Data

US 2007/0116461 A1   May 24, 2007

(51) Int. Cl.
*H04J 14/00* (2006.01)
*H04J 14/02* (2006.01)
*G02F 1/35* (2006.01)
*H03M 1/00* (2006.01)

(52) U.S. Cl. ............................. 398/45; 398/79; 398/82; 398/140; 359/326; 341/137

(58) Field of Classification Search ............. 398/45–49, 398/51, 54, 79, 82, 140–141, 150; 359/326, 359/618; 341/137
See application file for complete search history.

(56) References Cited

U.S. PATENT DOCUMENTS

| | | | | |
|---|---|---|---|---|
| 4,989,199 | A * | 1/1991 | Rzeszewski | 398/46 |
| 4,991,920 | A * | 2/1991 | Peczalski | 385/14 |
| 7,339,717 | B2 * | 3/2008 | Peer et al. | 359/326 |
| 2005/0238367 | A1 | 10/2005 | Chen et al. | |

* cited by examiner

*Primary Examiner*—M. R Sedighian

(57) ABSTRACT

An optical digital-to-analog (D/A) converter and a method of optically converting digital data into analog form. In one embodiment, the optical D/A converter includes: (1) a splitter configured to receive and split an input coherent optical carrier into a plurality of mutually coherent optical carriers, (2) a switching stage coupled to the splitter and including a corresponding plurality of selector switches configured to pass or interrupt selected ones of the plurality of coherent optical carriers responsive to pattern bits, (3) an amplitude and phase offset stage coupled to the switching stage and including a corresponding plurality of amplitude and phase offset units configured to offset amplitudes or phases of passed ones of the plurality of mutually coherent optical carriers responsive to offset signals and (4) a combiner coupled to the amplitude and phase offset stage and configured to recombine the mutually coherent optical carriers to yield an optical output signal.

20 Claims, 5 Drawing Sheets

OPTICAL DIGITAL-TO-ANALOG CONVERTER AND METHOD OF OPTICALLY CONVERTING DIGITAL DATA TO ANALOG FORM

GOVERNMENT CONTRACT

The U.S. Government has a paid-up license in the present invention and the right, in limited circumstances, to require the patent owner to license others on reasonable terms as provided for by the terms of Contract No. MDA972-03-C-0046 awarded by DARPA.

CROSS-REFERENCE TO RELATED APPLICATIONS

The present application is related to U.S. patent application Ser. No. 10/133,469, filed Apr. 26, 2002, U.S. patent application Ser. No. 10/674,722, filed Sep. 30, 2003, U.S. patent application Ser. No. 10/771,089, filed Feb. 3, 2004, and U.S. patent application Ser. No. 10/830,331, filed Apr. 22, 2004, all of which are commonly assigned with the present application and incorporated herein by reference.

TECHNICAL FIELD OF THE INVENTION

The present invention is directed, in general, to optical signal processing systems and, more particularly, to an optical digital-to-analog converter and a method of optically converting digital data to analog form.

BACKGROUND OF THE INVENTION

Digital-to-analog (D/A) converters are key elements in both electronic and photonic signal processing and data transmission. In many optical transmission systems, digital data has to be converted to analog form for processing and/or transmission. Indeed, there are many advantages for using optical technology to implementing D/A converters, for example, high-speed clocking and signal sampling, wide-bandwidth, light-weight components and the like. Additionally, a high-speed arbitrary analog waveform generator can be implemented using a very high-speed D/A converter.

One such optical D/A converter is described in an article entitle "Digital-to-Analog Conversion Using Electrooptic Modulators," authored by Yacoubian, et al., IEEE Photonics Technology Letters, vol. 15, no. 1, January 2003, pages 117-119. However, the disclosed implementation is limited to a so-called 2-bit photonic D/A converter.

Noise also affects the operation of optical D/A converters. One source of noise arises from voltage excursions in the control signals that are provided to electro-optical elements D/A converter. Noise due to the voltage excursions tends to increase, sometimes dramatically, as D/A operating speed increases. Excessive noise can render an optical D/A inadequate for important, high-speed applications, including those noted above.

Accordingly, what is needed in the art is an optical D/A converter that converts digital input data to analog form with less noise. What is needed in the art is an optical D/A converter that is less susceptible to control signal voltage excursions.

SUMMARY OF THE INVENTION

To address the above-discussed deficiencies of the prior art, the present invention provides, in one aspect, an optical D/A converter. In one embodiment, the optical D/A converter includes: (1) a splitter configured to receive and split an input coherent optical carrier into a plurality of mutually coherent optical carriers, (2) a switching stage coupled to the splitter and including a corresponding plurality of selector switches configured to pass or interrupt selected ones of the plurality of coherent optical carriers responsive to pattern bits, (3) an amplitude and phase offset stage coupled to the switching stage and including a corresponding plurality of amplitude and phase offset units configured to offset amplitudes or phases of passed ones of the plurality of mutually coherent optical carriers responsive to offset signals and (4) a combiner coupled to the amplitude and phase offset stage and configured to recombine the mutually coherent optical carriers to yield an optical output signal.

In another aspect, the present invention provides a method of optically converting digital data into analog form. In one embodiment, the method includes: (1) splitting an input coherent optical carrier into a plurality of mutually coherent optical carriers, (2) passing or interrupting selected ones of the plurality of coherent optical carriers responsive to pattern bits that are synchronous with respect to the digital data, (3) offsetting amplitudes or phases of passed ones of the plurality of mutually coherent optical carriers responsive to offset signals that are asynchronous with respect to the digital data and (4) recombining the mutually coherent optical carriers to yield an optical output signal.

The foregoing has outlined aspects and embodiments of the present invention so that those skilled in the pertinent art may better understand the detailed description that follows. Additional and alternative features will be described hereinafter that form the subject of the claims of the invention. Those skilled in the pertinent art should appreciate that they can readily use the disclosed conception and specific embodiment as a basis for designing or modifying other structures for carrying out the same purposes. Those skilled in the pertinent art should also realize that such equivalent constructions lie within the spirit and scope of the invention.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
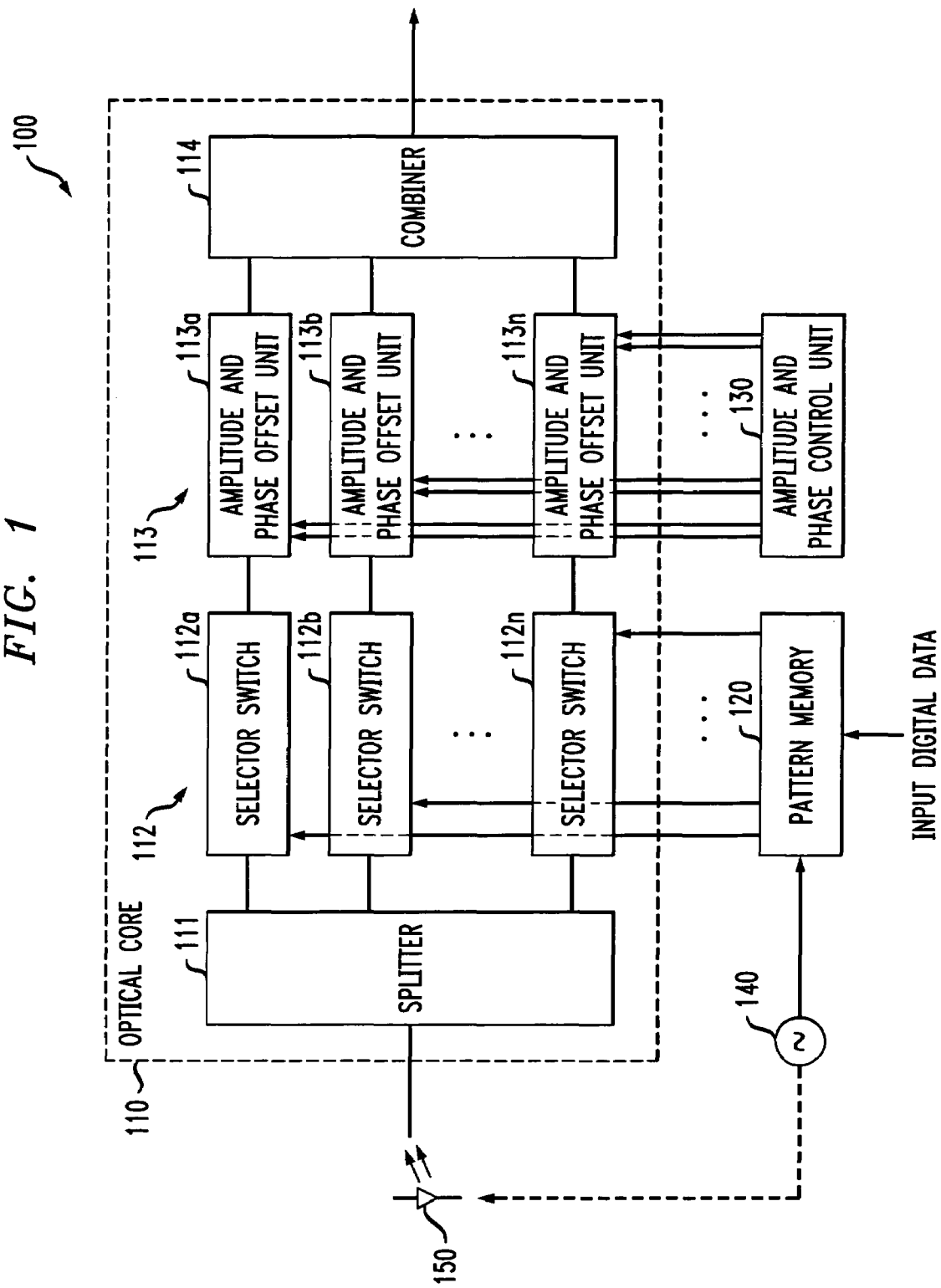
FIG. 1 illustrates a block diagram of a first embodiment of an optical D/A converter constructed according to the principles of the present invention.

Referring initially to FIG. 1, illustrated is a block diagram of a first embodiment of an optical D/A converter, generally designated 100, constructed according to the principles of the present invention. The embodiment of FIG. 1 includes an optical core 110, pattern memory 120, an amplitude and phase control unit 130, a clock 140 and a coherent light source 150.

The optical core 110 contains a splitter 111. The splitter 111 is configured to receive and split an input coherent optical carrier into a plurality of mutually coherent optical carriers. In the embodiment of FIG. 1, the splitter 111 produces n mutually coherent optical carriers. n is greater than one, but depends upon the desired characteristics of the analog output signal that is ultimately to be produced.

The optical core 110 further contains a switching stage 112. The switching stage 112 includes a corresponding plurality of selector switches, three of which are designated 112a, 112b, 112n. The plurality of selector switches 112a, 112b, 112n are configured to pass or interrupt selected ones of the plurality of coherent optical carriers responsive to pattern bits provided from the pattern memory 120.

The pattern bits are synchronous with respect to input digital data provided to the D/A converter 100. If the coherent light source 150 is pulsed, i.e., the input coherent optical carrier is a pulse stream, the clock 140 drives both the coherent light source 150 and the pattern memory 120, and the pattern bits are synchronous with both the input digital data and the pulse rate. If the coherent light source 150 is continuous, i.e., the input coherent optical carrier is a continuous wave, the clock 140 drives only the pattern memory 120, and the pattern bits are synchronous with the input digital data.

The optical core 110 further contains an amplitude and phase offset stage 113. The amplitude and phase offset stage 113 includes a corresponding plurality of amplitude and phase offset units, three of which are designated 113a, 113b, 113n. The amplitude and phase offset units 113a, 113b, 113n are configured to offset amplitudes or phases of passed ones of the plurality of mutually coherent optical carriers responsive to offset signals received from the amplitude and phase control unit 130.

Unlike the pattern bits, the offset signals are asynchronous with respect to the pulse rate. In some embodiments, the offset signals are set during a training phase of the D/A converter 100 and held constant during the subsequent operational phase.

The optical core 110 further contains a combiner 114. The combiner 114 is configured to recombine the mutually coherent optical carriers to yield an optical output signal. Through proper operation of the D/A converter 100, the optical output signal represents the analog form of the input digital data.

The optical output signal produced by the D/A converter 100 is substantially less susceptible to noise stemming from of voltage excursions in the control signals used to control the optical core 110. The D/A converter 100 achieves this result in a novel way by dividing modulation of the input coherent optical carrier into two stages: the switching stage 112 and the amplitude and phase offset stage 113. The pattern bits provided to the switching stage 112 change rapidly and may therefore be subject to voltage excursions. However, the switching stage 112 is only responsible for passing or interrupting selected ones of the coherent optical carriers, and not for making the relatively sensitive adjustments to phase that are required in the amplitude and phase offset stage 113 to modulate the amplitude and phase of the optical output signal. More will be stated on this point below.

The pattern memory 120 can be any conventional or later-developed memory unit capable of providing pattern bits to the switching stage 112. In the illustrated embodiment, the pattern memory 120 provides a single pattern bit to each selector switch (e.g., 112a, 112b, 112n). In alternative embodiments described below, the pattern memory 120 provides multiple pattern bits to each selector switch 112a, 112b, 112n to drive the selector switches 112a, 112b, 112n in a differential mode of operation. Those skilled in the pertinent art will recognize that storage of pattern bits in a pattern memory is not necessary to the present invention. A processor or other circuitry may be used to generate pattern bits in real time.

The amplitude and phase control unit 130 provides analog offset signals to drive the amplitude and phase offset units (e.g., 113a, 113b, 113n) either in a differential mode of operation (to effect amplitude modulation in the optical output signal) or a common mode of operation (to effect phase modulation in the optical output signal).

The coherent light source 150 typically includes a continuous wave or pulsed laser to generate an optical signal at a desired wavelength. Exemplary optical signals to be processed have optical frequencies of about $2.3 \times 10^{14}$ Hertz to about $1.8 \times 10^{14}$ Hertz, i.e., a wavelength of about 1.3 microns to about 1.7 microns. In one example, a continuous wave optical signal having a wavelength of approximately 1.55 microns, i.e., a frequency of $1.93 \times 10^{14}$ Hertz, is generated by the coherent light source 150 and supplied to the optical core 110.

Figure 2:
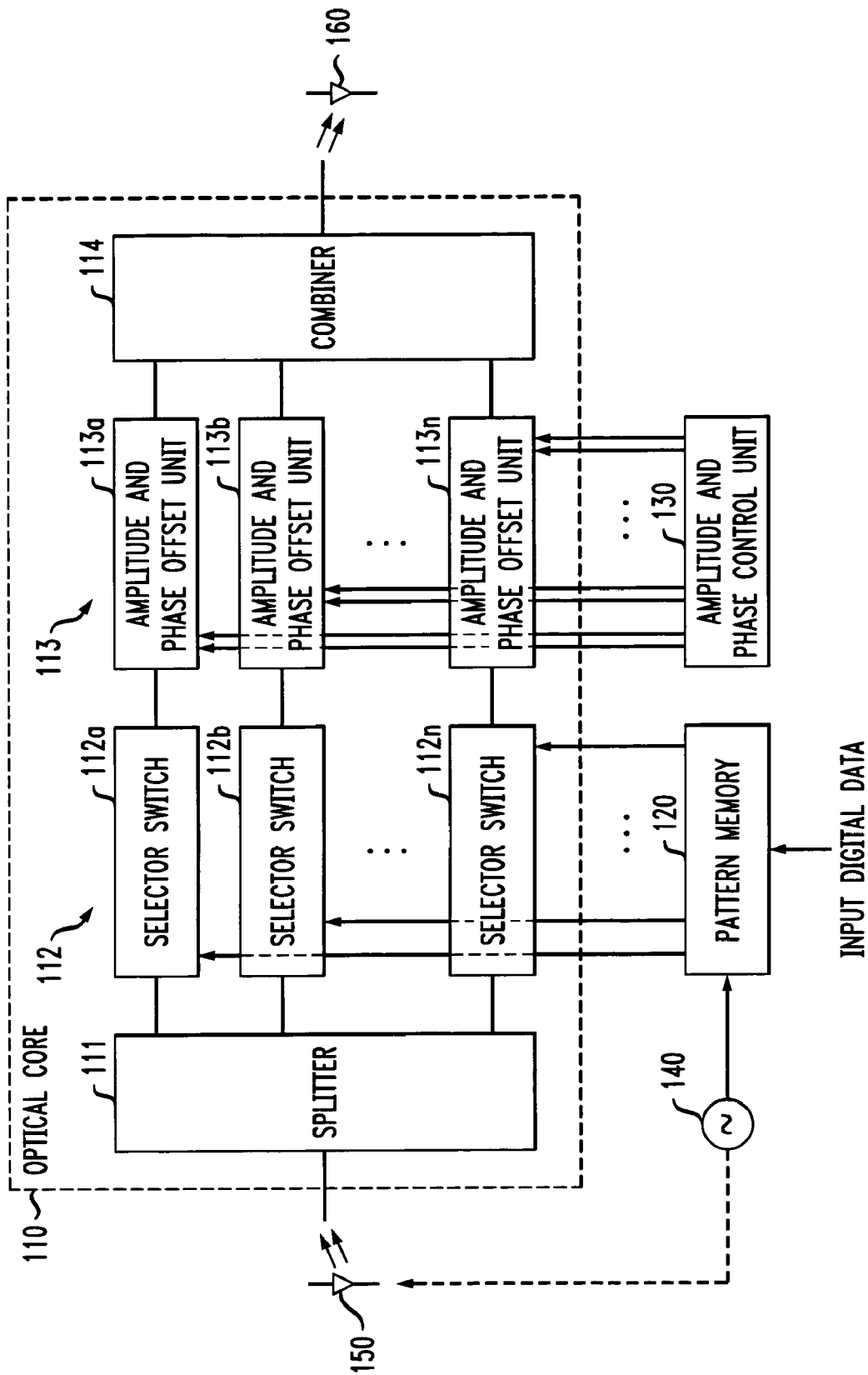
FIG. 2 illustrates a block diagram of a second embodiment of an optical D/A converter constructed according to the principles of the present invention.

Turning now to FIG. 2, illustrated is a block diagram of a second embodiment of an optical D/A converter constructed according to the principles of the present invention. The embodiment of FIG. 2 is similar to that of FIG. 1 and includes similar elements that are essentially identical from both a physical and functional standpoint. These similar elements bear the same reference numerals as those in FIG. 1 and therefore will not be discussed again in detail. FIG. 2 further illustrates a photoreceiver 160. The photoreceiver 160 is configured to convert the optical output signal into a corresponding output electrical signal. In the embodiment of FIG. 2, the photoreceiver 160 is a photodiode. Thus, the D/A converter 100 may, in various embodiments, produce amplitude- and phase-modulated output optical signals or amplitude-modulated output electrical signals, as desired. Those skilled in the pertinent art understand that conversion of the output optical signal to electrical form results in a loss of phase information, with only amplitude information remaining.

Figure 3:
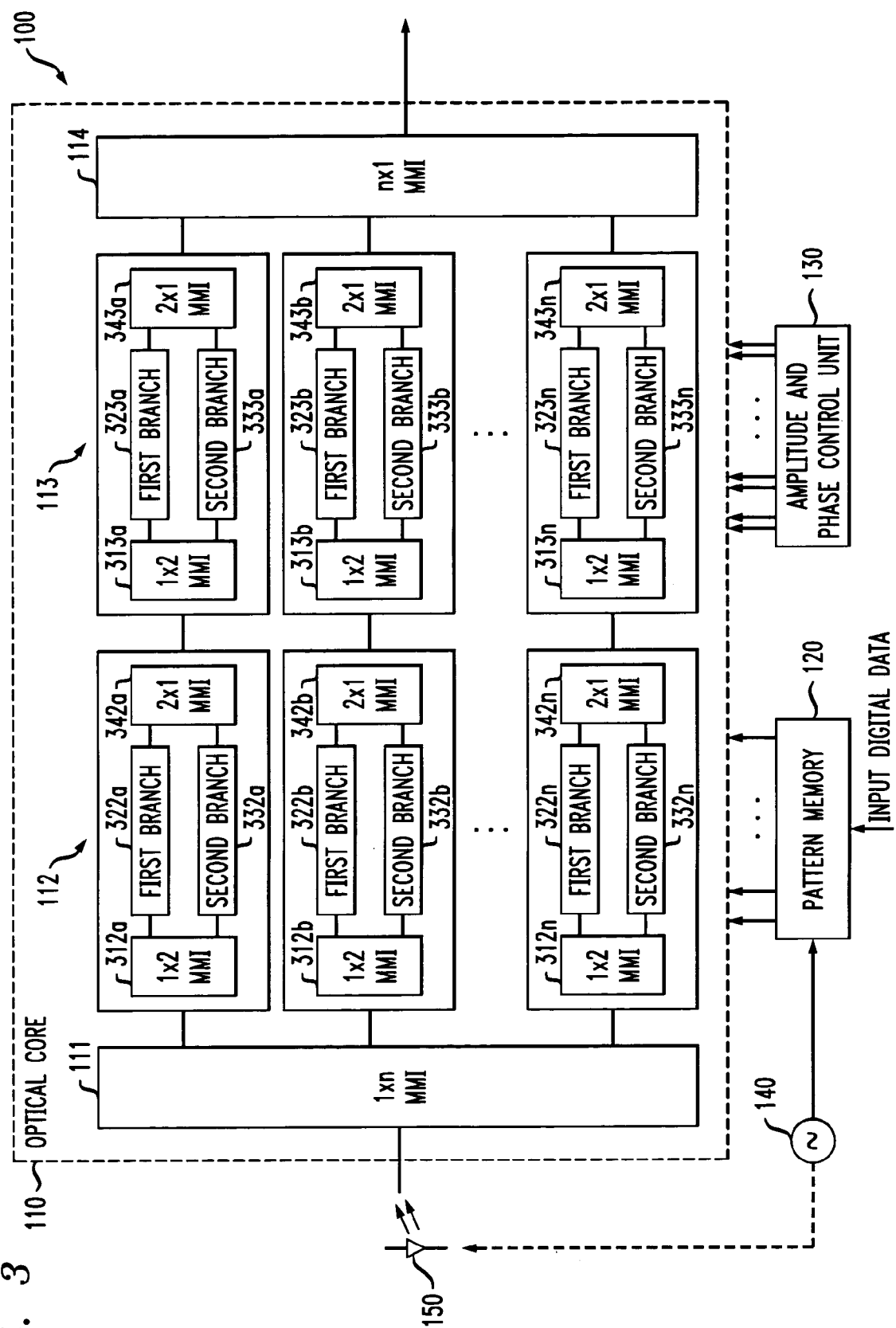
FIG. 3 illustrates a block diagram of a third embodiment of an optical D/A converter constructed according to the principles of the present invention.

Turning now to FIG. 3, illustrated is a block diagram of a third embodiment of an optical D/A converter constructed according to the principles of the present invention. The embodiment of FIG. 3 is similar to that of FIG. 2 and includes similar elements that are essentially identical from both a physical and functional standpoint. These similar elements bear the same reference numerals as those in FIG. 2 and therefore will not be discussed again in detail. It should be noted, however, that FIG. 3 specifies the splitter 111 as being a 1×n multimode interference (MMI) coupler and further specifies the combiner 114 as being an n×1 MMI coupler. Also, because FIG. 3 contains an increased number of illustrated elements, the buses (not separately referenced) that transmit pattern bits from the pattern memory 120 to the selector switches 112a, 112b, 112n and control signals from the amplitude and phase control unit 130 to the amplitude and phase offset units 113a, 113b, 113n are foreshortened, although they extend as shown in FIGS. 1 and 2.

In the embodiment of FIG. 3, the selector switches 112a, 112b, 112n are illustrated as being Mach-Zehnder modulators (MZMs). Likewise, the amplitude and phase offset units 113a, 113b, 113n are illustrated as being MZMs. In alternative embodiments, some, but not all, of the selector switches 112a, 112b, 112n and the amplitude and phase offset units 113a, 113b, 113n are MZMs.

Those skilled in the pertinent art understand that a MZM provides separate first and second branches spanning a splitter and a combiner. Changes in optical transmission characteristics along either or both of the first and second branches are often detectable in interference emerging from the combiner. In the context of the illustrated embodiment, the pattern bits and control signals are such that the emerging interference is not only detectable, but has desired amplitude or phase characteristics.

Accordingly, FIG. 3 illustrates the selector switch 112a as including a 1×2 MMI coupler 312a, first and second branches 322a, 332a coupled at ends thereof to the 1×2 MMI coupler 312a and a 2×1 MMI coupler 342a coupled to ends of said first and second branches distal from the 1×2 MMI coupler 312a. FIG. 3 illustrates the same configuration for the selector switch 112b (e.g., a 1×2 MMI coupler 312b, first and second branches 322b, 332b and a 2×1 MMI coupler 342b) and the selector switch 112n (e.g., a 1×2 MMI coupler 312n, first and second branches 322n, 332n and a 2×1 MMI coupler 342n).

FIG. 3 also illustrates the amplitude and phase offset unit 113a as including a 1×2 MMI coupler 313a, first and second branches 323a, 333a coupled at ends thereof to the 1×2 MMI coupler 313a and a 2×1 MMI coupler 343a coupled to ends of said first and second branches distal from the 1×2 MMI coupler 313a. FIG. 3 illustrates the same configuration for the amplitude and phase offset unit 113b (e.g., a 1×2 MMI coupler 313b, first and second branches 323b, 333b and a 2×1 MMI coupler 343b) and the amplitude and phase offset unit 113n (e.g., a 1×2 MMI coupler 313n, first and second branches 323n, 333n and a 2×1 MMI coupler 343n).

As stated above, the function of the switching stage 112 is to use the plurality of selector switches 112a, 112b, 112n to pass or interrupt selected ones of the plurality of coherent optical carriers. When the selector switches 112a, 112b, 112n take the form of MZMs, the pattern bits drive the selector switches 112a, 112b, 112n in a differential mode. In the context of FIG. 3, this may be done in one of two ways. The pattern memory 120 may provide a single line to each selector switch 112a, 112b, 112n (as shown), in which case the branches are designed to respond oppositely to the same signal, ensuring that they branches are driven 1800 out of phase. Alternatively, the branches are designed to respond in the same way to the same signal, and the pattern memory 120 provides a line to each branch of each selector switch 112a, 112b, 112n. The pattern memory 120 then ensures that the pattern bits provided to a given selector switch 112a, 112b, 112n are inverse to one another. Both cases result in push-pull configurations for controlling the MZMs, e.g., as described in U.S. patent application Ser. No. 10/830,331, supra.

Also as stated above, the function of the amplitude and phase offset stage 113 is to use the plurality of amplitude and phase offset units 113a, 113b, 113n to offset amplitudes or phases of passed ones of the plurality of mutually coherent optical carriers. When the amplitude and phase offset units 113a, 113b, 113n are MZMs, the control signals drive the amplitude and phase offset units 113a, 113b, 113n in either in a differential mode of operation to effect amplitude modulation in the optical output signal or a common mode of operation to effect phase modulation in the optical output signal. Because the amplitude and phase control unit 130 accommodates both differential and common drive modes, two lines extend from the amplitude and phase control unit 130 to each of the amplitude and phase offset units 113a, 113b, 113n (as shown).

The pattern bits provided to the selector switches 112a, 112b, 112n are discrete and binary in nature. In contrast, the control signals provided to the amplitude and phase offset units 113a, 113b, 113n may assume any of a continuous range of analog values. This reflects a principle underlying the present invention. While the pattern bits change at a relatively high speed during operation of the D/A converter 100 and may as a result be subject to voltage excursions, the excursions are of negligible consequence, because the pattern bits drive the selector switches 112a, 112b, 112n such that they are relatively insensitive to voltage excursion. In contrast, the control signals change slowly over time (in some embodiments set during a training phase of the D/A converter's operation and thereafter held constant), which renders them relatively immune to voltage excursions. As a result, the amplitude and phase offsets they effect exhibit substantially reduced noise.

The amplitude and phase offset units 113a, 113b, 113n may be fabricated, e.g., in a material system with a linear electro-optic effect, such as InP, GaAs or $LiNbO_3$. In such material systems, the effective refractive index of an optical waveguide changes in proportion to an electrical field applied normal to the waveguide. A high frequency distributed electrical waveguide may therefore be engineered to co-propagate with the optical wave with a matched propagating velocity to deliver the electrical field with a high modulation bandwidth. The different branches in the amplitude and phase offset units 113a, 113b, 113n will delay the optical signal by different lengths of time as synchronous with respect to the values of the analog control signals. This results in different phases at the outputs of the amplitude and phase offset units 113a, 113b, 113n. In the n×1 MMI 114, these different output phase signals that interfere have a different optical signal phase due to the different time delays these signals experienced. The resulting optical signal after the n×1 MMI 114 is the sum of all the phase-shifted optical signals that interfere.

Figure 4:
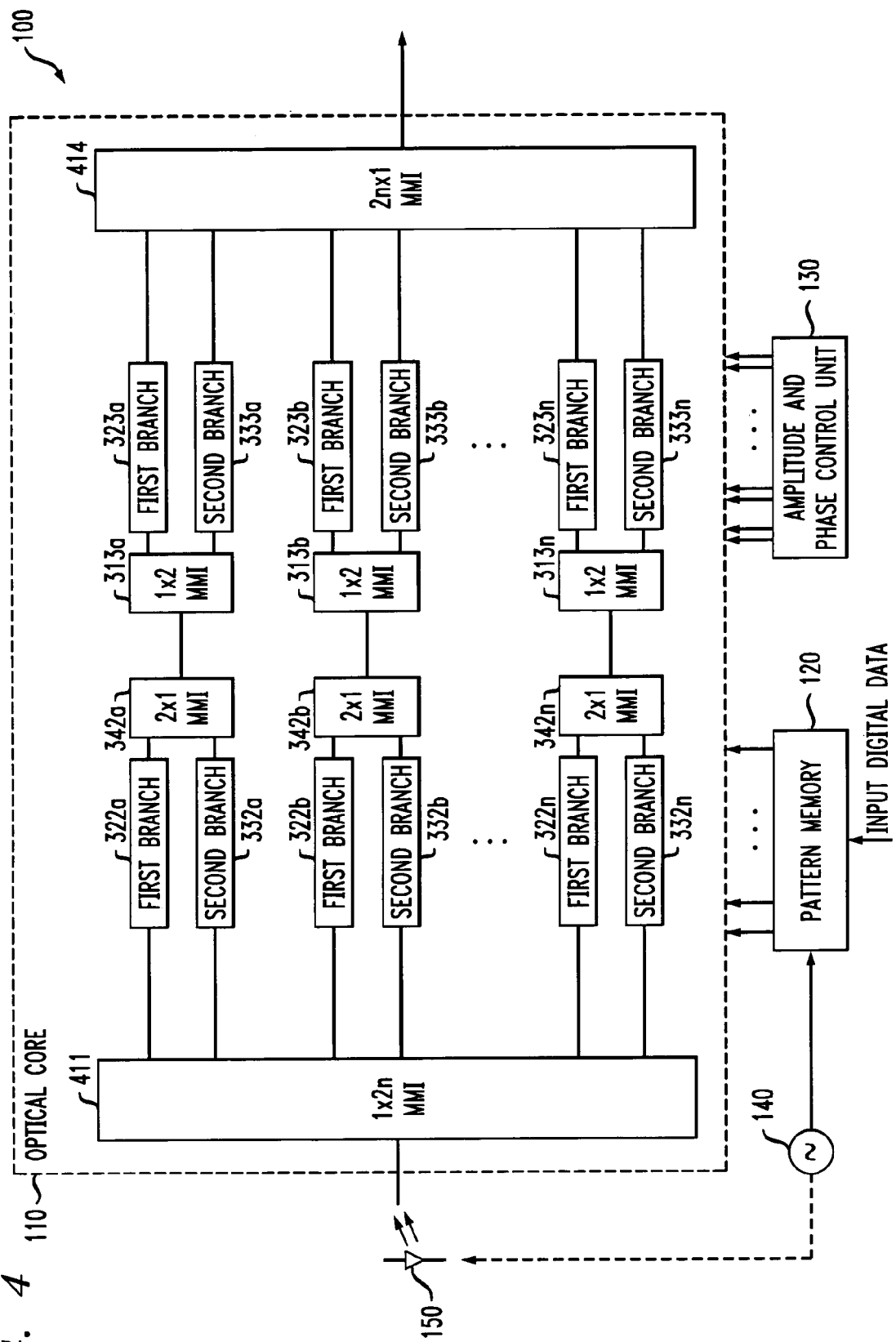
FIG. 4 illustrates a block diagram of a fourth embodiment of an optical D/A converter constructed according to the principles of the present invention.

Turning now to FIG. 4, illustrated is a block diagram of a fourth embodiment of an optical D/A converter constructed according to the principles of the present invention. The embodiment of FIG. 4 is similar to that of FIG. 3 and includes similar elements that are essentially identical from both a physical and functional standpoint. These similar elements bear the same reference numerals as those in FIG. 3 and therefore will not be discussed again in detail.

The embodiment of FIG. 4 recognizes that the 1×n MMI coupler 111 and the 1×2 MMI couplers 312a, 312b, 312n can be combined into a single 1×2n MMI coupler. Likewise, the 2×1 MMI couplers 343a, 343b, 343n and the n×1 MMI coupler 114 can be combined into a single 2n×1 MMI coupler. This advantageously reduces component count.

Figure 5:
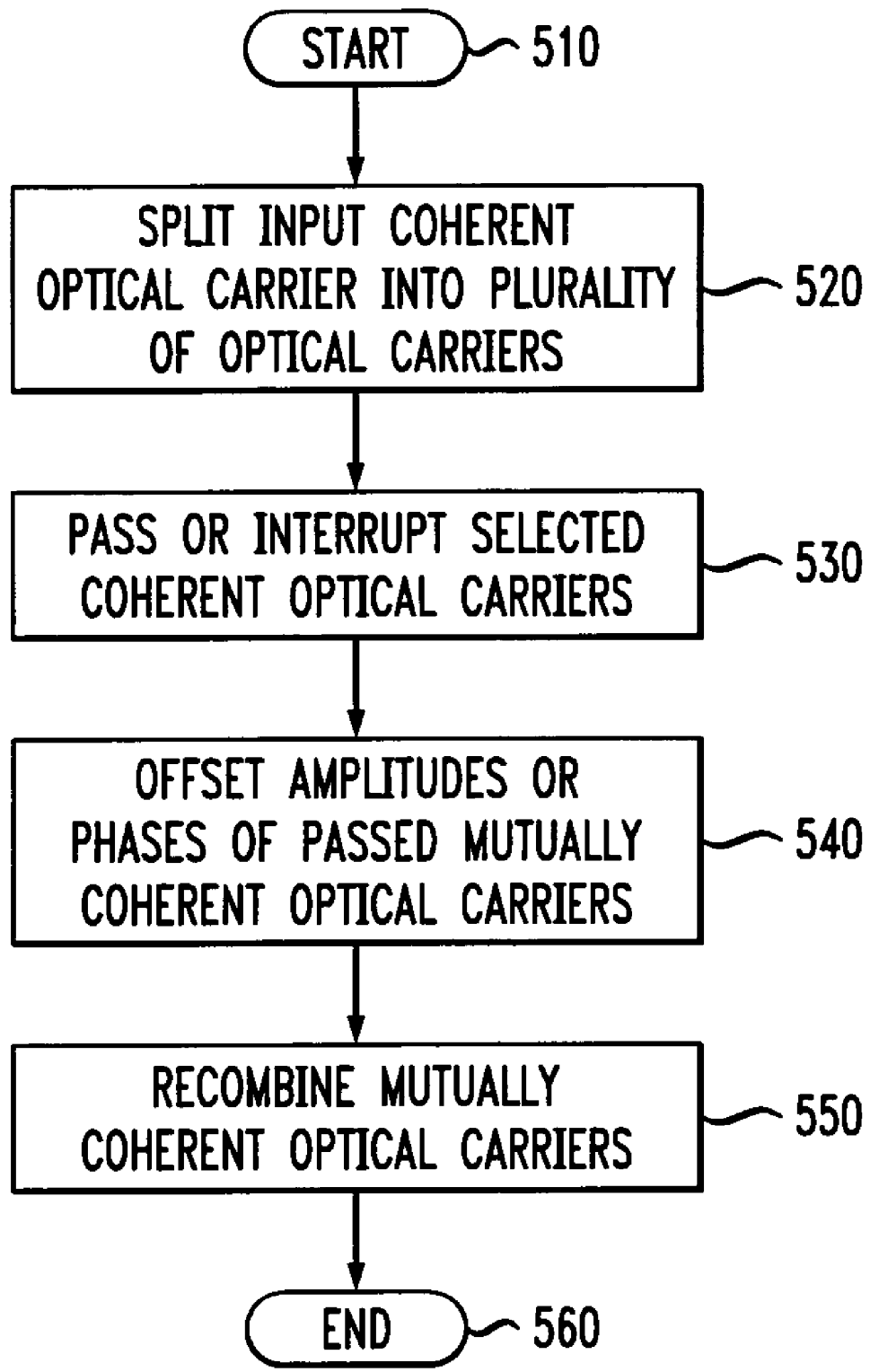
FIG. 5 illustrates a flow diagram of one embodiment of a method of optically converting digital data into analog form carried out according to the principles of the present invention.

Turning now to FIG. 5, illustrated is a flow diagram of one embodiment of a method of optically converting digital data into analog form carried out according to the principles of the present invention. The method begins in a start step 510, in which an input coherent optical carrier is generated. In a step 520, the input coherent optical carrier is split into a plurality of mutually coherent optical carriers. In a step 530, selected ones of the plurality of coherent optical carriers are passed or interrupted responsive to pattern bits that are synchronous with respect to the digital data. In a step 540, amplitudes or phases of passed ones of the plurality of mutually coherent optical carriers are offset responsive to offset signals that are synchronous with respect to the digital data (perhaps remaining unchanged during normal operation of the D/A converter). In a step 550, the mutually coherent optical carriers are recombined to yield an optical output signal. The method ends in an end step 560.

The method of FIG. 5 may be performed with any of the optical D/A converters 100 of FIGS. 1, 2, 3 or 4 or with an optical D/A converter of any other conventional or later-developed type.

Although certain embodiments of the present invention have been described in detail, those skilled in the pertinent art should understand that they can make various changes, substitutions and alterations herein without departing from the spirit and scope of the invention.

What is claimed is:

1. An optical digital-to-analog converter, comprising:
   a splitter configured to receive and split an input coherent optical carrier into a plurality of mutually coherent optical carriers;
   a switching stage coupled to said splitter and including a corresponding plurality of selector switches configured to pass or interrupt selected ones of said plurality of coherent optical carriers responsive to pattern bits;
   an amplitude and phase offset stage coupled to said switching stage and including a corresponding plurality of amplitude and phase offset units configured to offset amplitudes or phases of passed ones of said plurality of mutually coherent optical carriers responsive to offset signals; and
   a combiner coupled to said amplitude and phase offset stage and configured to recombine said mutually coherent optical carriers to yield an optical output signal.

2. The optical digital-to-analog converter as recited in claim 1 further comprising a photoreceiver configured to receive and convert said optical output signal into a corresponding output electrical signal.

3. The optical digital-to-analog converter as recited in claim 1 wherein each of said selector switches comprises first and second branches and a 2×1 multimode interference coupler coupled to ends of said first and second branches.

4. The optical digital-to-analog converter as recited in claim 3 wherein said each of said selector switches is a Mach-Zehnder modulator.

5. The optical digital-to-analog converter as recited in claim 1 wherein each of said amplitude and phase offset units comprises a 2×1 multimode interference coupler and first and second branches coupled thereto at ends thereof.

6. The optical digital-to-analog converter as recited in claim 5 wherein said each of said amplitude and phase offset units is a Mach-Zehnder modulator.

7. The optical digital-to-analog converter as recited in claim 1 further comprising a pattern memory configured to provide said pattern bits to drive said plurality of selector switches in a differential mode.

8. The optical digital-to-analog converter as recited in claim 1 further comprising an amplitude and phase control unit configured to provide said offset signals to drive said plurality of amplitude and phase offset units in a differential mode to control an amplitude of said optical output signal and in a common mode to control a phase of said optical output signal.

9. The optical digital-to-analog converter as recited in claim 7 further comprising a coherent light source configured to provide said input coherent optical carrier and a clock coupled to said coherent light source and said pattern memory.

10. The optical digital-to-analog converter as recited in claim 1 wherein magnitudes of said offset signals are established during a training phase of said optical digital-to-analog converter.

11. A method of optically converting digital data into analog form, comprising:
    splitting an input coherent optical carrier into a plurality of mutually coherent optical carriers;
    passing or interrupting selected ones of said plurality of coherent optical carriers responsive to pattern bits that are synchronous with respect to said digital data;
    offsetting amplitudes or phases of passed ones of said plurality of mutually coherent optical carriers responsive to offset signals that are asynchronous with respect to said digital data; and
    recombining said mutually coherent optical carriers to yield an optical output signal.

12. The method as recited in claim 11 further comprising converting said optical output signal into a corresponding output electrical signal.

13. The method as recited in claim 11 wherein said passing or interrupting is carried out with a plurality of first and second branches and 2×1 multimode interference couplers coupled to ends of said plurality of first and second branches.

14. The method as recited in claim 11 wherein said passing or interrupting is carried out with a plurality of Mach-Zehnder modulators.

15. The method as recited in claim 11 wherein said offsetting is carried out with a plurality of 2×1 multimode interference couplers and a plurality of first and second branches coupled thereto at ends thereof.

16. The method as recited in claim 11 wherein said offsetting is carried out with a plurality of Mach-Zehnder modulators.

17. The method as recited in claim 11 wherein said passing or interrupting comprises providing said pattern bits to drive a plurality of selector switches in a differential mode.

18. The method as recited in claim 11 wherein said offsetting comprises providing said offset signals to drive a plurality of amplitude and phase offset units in a differential mode to control an amplitude of said optical output signal and in a common mode to control a phase of said optical output signal.

19. The method as recited in claim 17 further comprising:
    employing a coherent light source to provide said input coherent optical carrier; and
    employing a clock to synchronize said coherent light source and a pattern memory.

20. The method as recited in claim 11 further comprising establishing magnitudes of said offset signals during a training phase of said optical digital-to-analog converter.

* * * * *